(12) United States Patent
Kaufmann et al.

(10) Patent No.: US 11,562,270 B2
(45) Date of Patent: Jan. 24, 2023

(54) STRAGGLER MITIGATION FOR ITERATIVE MACHINE LEARNING VIA TASK PREEMPTION

(71) Applicant: International Business Machines Corporation, Armonk, NY (US)

(72) Inventors: Michael Kaufmann, Adliswil (CH); Thomas Parnell, Zurich (CH); Antonios Kornilios Kourtis, Zurich (CH); Celestine Mendler-Duenner, Wettswil (CH)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 16/838,049

(22) Filed: Apr. 2, 2020

(65) Prior Publication Data

US 2021/0312241 A1    Oct. 7, 2021

(51) Int. Cl.
| | |
|---|---|
| *G06F 3/048* | (2013.01) |
| *G06N 5/04* | (2006.01) |
| *G06K 9/62* | (2022.01) |
| *G06N 20/00* | (2019.01) |
| *G06N 3/08* | (2006.01) |

(52) U.S. Cl.
CPC ........... *G06N 5/043* (2013.01); *G06K 9/6256* (2013.01); *G06K 9/6264* (2013.01); *G06N 20/00* (2019.01); *G06N 3/084* (2013.01)

(58) Field of Classification Search
CPC ........ G06N 5/043; G06N 20/00; G06N 3/084; G06K 9/6256; G06K 9/6264
See application file for complete search history.

(56) References Cited

U.S. PATENT DOCUMENTS

| | | | | |
|---|---|---|---|---|
| 11,244,242 | B2* | 2/2022 | Prakash | G06N 3/08 |
| 2017/0161025 | A1* | 6/2017 | Anderson | G06F 8/71 |
| 2017/0236072 | A1 | 8/2017 | Rendle | |

(Continued)

OTHER PUBLICATIONS

Abadi et al., "TensorFlow: A System for Large-Scale Machine Learning", This paper is included in the Proceedings of the 12th USENIX Symposium on Operating Systems Design and Implementation (OSDI '16), Nov. 2-4, 2016, ISBN 978-1-931971-33-1,<https://www.usenix.org/conference/osdi16/technical-sessions/presentation/abadi>.

(Continued)

*Primary Examiner* — David Phantana-angkool
(74) *Attorney, Agent, or Firm* — Brian M. Restauro

(57) ABSTRACT

Embodiments of the present invention provide computer-implemented methods, computer program products and systems. Embodiments of the present invention can run preemptable tasks distributed according to a distributed environment, wherein each task of a plurality of preemptable tasks has been assigned two or more of the training data samples to process during each iteration. Embodiments of the present invention can, upon verifying that a preemption condition for each iteration is satisfied: preempt any task of the preemptable tasks that have started processing training data samples assigned to it, and update the cognitive model based on outputs obtained from completed tasks, including outputs obtained from both the preempted tasks and completed tasks that have finished processing all training data samples as assigned to it.

20 Claims, 4 Drawing Sheets

(56) References Cited

U.S. PATENT DOCUMENTS

| | | | | |
|---|---|---|---|---|
| 2019/0095819 | A1 | 3/2019 | Varadarajan | |
| 2020/0020318 | A1* | 1/2020 | Canada | G06N 5/04 |
| 2020/0356815 | A1* | 11/2020 | Ioannou | G06F 9/3885 |
| 2021/0312241 | A1* | 10/2021 | Kaufmann | G06N 20/00 |
| 2021/0334709 | A1* | 10/2021 | Ioannou | G06N 5/003 |
| 2022/0164235 | A1* | 5/2022 | Zuzga | G06F 9/5027 |
| 2022/0238193 | A1* | 7/2022 | Koc | G16H 10/60 |

OTHER PUBLICATIONS

Anathanarayanan et al., "Effective Straggler Mitigation: Attack of the Clones", USENIX Association, 10th USENIX Symposium on Networked Systems Design and Implementation (NSDI '13), 14 pages.

Cipar et al., "Solving the Straggler Problem with Bounded Staleness", © USENIX 2020, 2 pages, <https://www.usenix.org/conference/hotos13/session/cipar>.

Ho et al., "More Effective Distributed ML via a Stale Synchronous Parallel Parameter Server", Printed Mar. 10, 2020, 9 pages.

Lin et al., "Don't Use Large Mini-Batches, Use Local SGD", arXiv:1808.07217v1 [cs.LG] Aug. 22, 2018, 21 pages.

Ousterhout et al., "The Case for Tiny Tasks in Compute Clusters", © USENIX 2020, 2 pages, <https://www.usenix.org/conference/hotos13/session/ousterhout>.

Smith et al., "CoCoA: A General Framework for Communication-Efficient Distributed Optimization", Journal of Machine Learning Research, 2018, 49 pages.

Tandon et al., "Gradient Coding: Avoiding Stragglers in Distributed Learning", Proceedings of the 34 th International Conference on Machine Learning, Sydney, Australia, PMLR 70, 2017. Copyright 2017 by the author(s), 9 pages.

Yang et al, "Intelligent Resource Scheduling at Scale: a Machine Learning Perspective", IEEE International Symposium on Service Oriented System Engineering. 2018 IEEE SOSE, Mar. 26-29, 2018, © 2018 IEEE, 11 pages.

Kaufmann, Michael, "Improving The Efficiency of Heterogenous Clouds, Mar. 16, 2020 Karlsruhe Institute of Technology", PhD dissertation, <https://publikationen.bibliothek.kit.edu/1000117451/63577062>.

\* cited by examiner

STRAGGLER MITIGATION FOR ITERATIVE MACHINE LEARNING VIA TASK PREEMPTION

STATEMENT REGARDING PRIOR DISCLOSURES BY THE INVENTOR OR A JOINT INVENTOR

The following disclosure(s) are submitted under 35 U.S.C. § 102(b)(1)(A):
DISCLOSURE(S):
(1) Michael Kaufmann, "Improving The Efficiency of Heterogenous Clouds, Mar. 16, 2020 Karlsruhe Institute of Technology, PhD dissertation, https://publikationen.bibliothek.kit.edu/1000117451/63577062.

BACKGROUND

The invention relates in general to computerized techniques for training a cognitive model based on training data samples. In particular, it is directed to methods involving iterative training algorithms run in a distributed environment, and aiming at mitigating stragglers.

As data becomes a major source of insight, machine learning (ML) grows into a dominant workload in many (public and private) cloud environments. Ever-increasing collection of data drives the development of efficient algorithms and systems for distributed ML as resource demands often exceed the capacity of single nodes. However, given the usage of cloud resources, a distributed execution poses additional challenges in terms of resource utilization. Recent efforts have aimed to improve resource utilization and flexibility of ML applications.

For example, the so-called Communication-efficient distributed dual Coordinate Ascent (CoCoA) framework was proposed for efficient, distributed training of generalized linear models (GLMs). CoCoA significantly outperforms other distributed methods, such as mini-batch versions of stochastic gradient descent (SGD) and stochastic dual coordinate ascent (SDCA) by minimizing the amount of communication necessary between the training steps.

Many iterative distributed ML training algorithms, such as CoCoA and the so-called mini-batch SGD, are implemented using a form of bulk synchronous parallel (BSP) programming model, where a set of tasks are executed on multiple compute nodes and synchronize periodically. Synchronization is typically done using a global barrier. Stragglers are tasks that run unexpectedly longer than other tasks. As all tasks need to reach a barrier in order for the application to make progress, a single straggler can prolong the training.

Current approaches to address stragglers in iterative machine learning algorithms include relaxed consistency models and worker replication.

Relaxed consistency models. The most common approach of addressing stragglers in distributed ML training, is the so-called stale synchronous parallel (SSP) method, a generalization of the BSP method, which is based on the relaxation of consistency guarantees and makes use of the auto-correcting property of ML algorithms in respect of bounded errors. Several variations of SSP are known.

SSP introduces a staleness parameter n that allows schedulers to start tasks of iteration i as soon as all tasks of iteration i−1−n have finished. This effectively allows the scheduler to execute tasks of multiple iterations in parallel, a thing that is forbidden in the BSP method. For n=0, SSP is equivalent to BSP. SSP can effectively mitigate scheduling gaps caused by stragglers. The relaxed consistency constraints of SSP introduce small errors in the computation of updates as it omits updates from slow workers in a current iteration. This, however, is corrected in subsequent iterations, by virtue of a mechanism that increases the total number of iterations (and therefore epochs) needed to converge, although this is compensated by a reduced time per iteration, to some extent. Furthermore, SSP assumes that stragglers are intermittent and occur on random workers. Thus, this approach cannot compensate for static performance differences encountered in heterogeneous systems.

Worker replication. Another approach to straggler mitigation is worker replication. Here, in addition to K regular workers, m backup workers are used during the training, which allows the system to proceed to the next iteration after any K workers out of the K+m workers have finished. This approach exploits the stochastic nature of ML training algorithms without introducing any errors in the computation of the updates. However, it comes at the cost of using additional resources, which are needed even if no stragglers occur. Thus, (K+m)/K as many resources are required during the training. As with SSP methods, this approach cannot compensate for static performance differences encountered in heterogeneous systems.

SUMMARY

According to a first aspect, the present invention is embodied as a computer-implemented method of training a cognitive model based on training data samples of a training dataset. The method involves an iterative training algorithm, which is run in a distributed environment. Running this algorithm causes, at each iteration of the training algorithm, to run preemptable tasks, wherein each task was assigned two or more training data samples to process during this iteration. The preemptable tasks are distributed so as to exploit the distributed environment. The algorithm further causes to execute certain actions if a preemption condition is satisfied. That is, upon verifying that a preemption condition for a current iteration is satisfied, the algorithm causes to preempt any straggling task, i.e., a task that has not yet finished processing all of the training data samples initially assigned to it. Finally, at each iteration, the cognitive model is updated based on all available outputs, these including outputs obtained from both the preempted tasks and any completed task, i.e., a task that has finished processing all of the training data samples as initially assigned to it at this iteration.

Updating the cognitive model preferably comprises adjusting updates arising from outputs obtained from each of the preempted tasks (e.g., by weighting such updates), to account for training data samples that have not been processed by the preempted tasks.

In preferred embodiments, the method further comprises evaluating the preemption condition (at each iteration), based on monitored completion statuses of the tasks. The preemption condition may notably be verified to be satisfied if at least a given fraction of the preemptable tasks have finished processing all of the training data samples assigned to them.

According to another aspect, the invention is embodied as a distributed computerized system for training a cognitive model. The system basically comprises a plurality of processing means, which underlie a distributed computing environment, as well as storage means, which notably store computerized methods. The latter include an iterative training algorithm. The computerized methods are executable by the plurality of processing, whereby the system is configured to train the cognitive model based on training data samples of a training dataset, by running the iterative training algorithm in said distributed environment. Consistently with the first aspect of the invention, the training algorithm is designed so as to cause, in operation of the system, to run preemptable tasks distributed according to said distributed environment, wherein each of the tasks has been assigned two or more of said training data samples to process during each iteration. And upon verifying that a preemption condition for said each iteration is satisfied, the algorithm further causes the system to: (i) preempt any of the tasks that has not yet finished processing all of the training data samples assigned to it; and (ii) update the cognitive model based on outputs obtained from the tasks, including outputs obtained from both the preempted tasks and any of the tasks that has finished processing all of the training data samples as assigned to it.

According to a final aspect, the invention is embodied as a computer program product for training a cognitive model in a distributed environment. The computer program product comprises a computer readable storage medium having program instructions embodied therewith. The program instructions are executable by a plurality of processing means forming part of said distributed environment, so as to cause such processing means to take steps according to the method evoked above.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The drawings in FIG. 3 show simplified representations of the computerized units of the system. Similar or functionally similar elements in the figures have been allocated the same numeral references, unless otherwise indicated.

DETAILED DESCRIPTION

As noted in the background section, the current approaches to straggler mitigation cannot compensate for static performance differences encountered in heterogeneous systems. Having realized this, the present inventors took up the challenge to develop new straggler mitigation techniques suited for distributed environments, where such techniques exploit the ability of straggling tasks to produce valid updates, even if such tasks have processed only a subset of the intended training samples. This is achieved by preempting straggling tasks, at each iteration of the iterative machine learning (ML) algorithm.

The following description is structured as follows. First, general embodiments and high-level variants are described (sect. 1). The next section addresses more specific embodiments and technical implementation details (sect. 2 and 3).

1. General Embodiments and High-Level Variants

Figure 1:
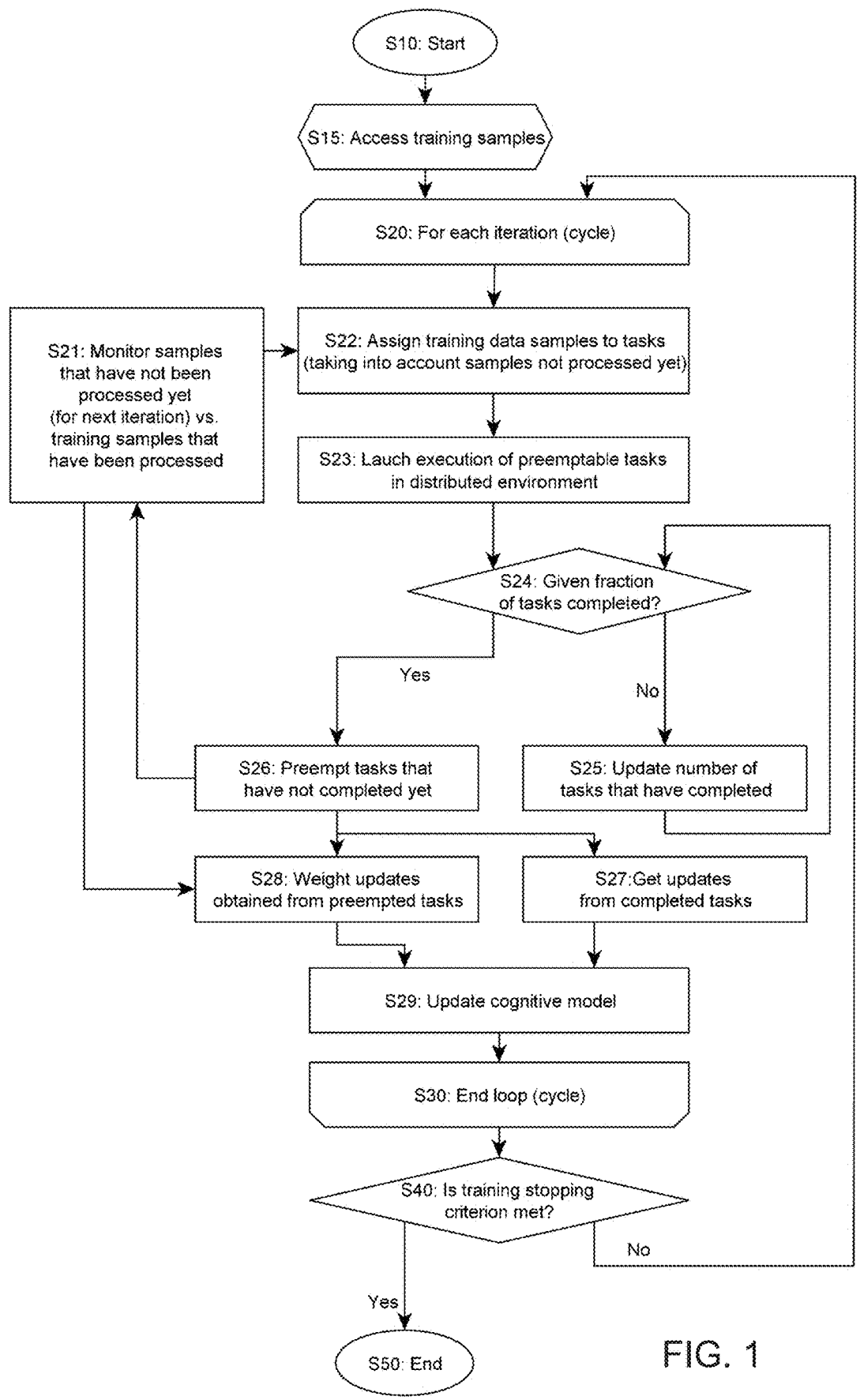
FIG. 1 is a flowchart illustrating high-level steps of a method of training a cognitive model using an iterative training algorithm in a distributed environment, according to embodiments.
Figure 2:
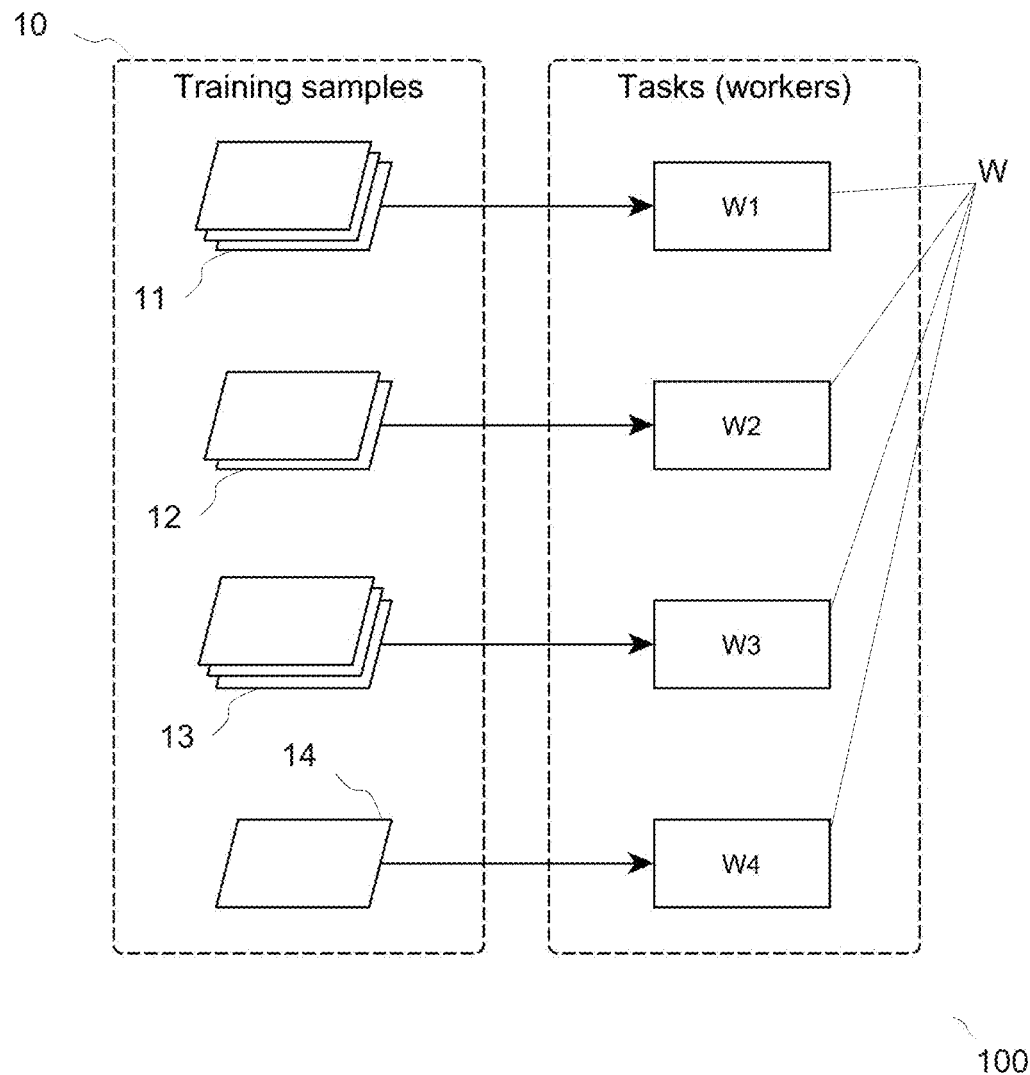
FIG. 2 is a diagram schematically illustrating how training data samples are assigned to different workers, during an iteration of this iterative training algorithm.
Figure 3:
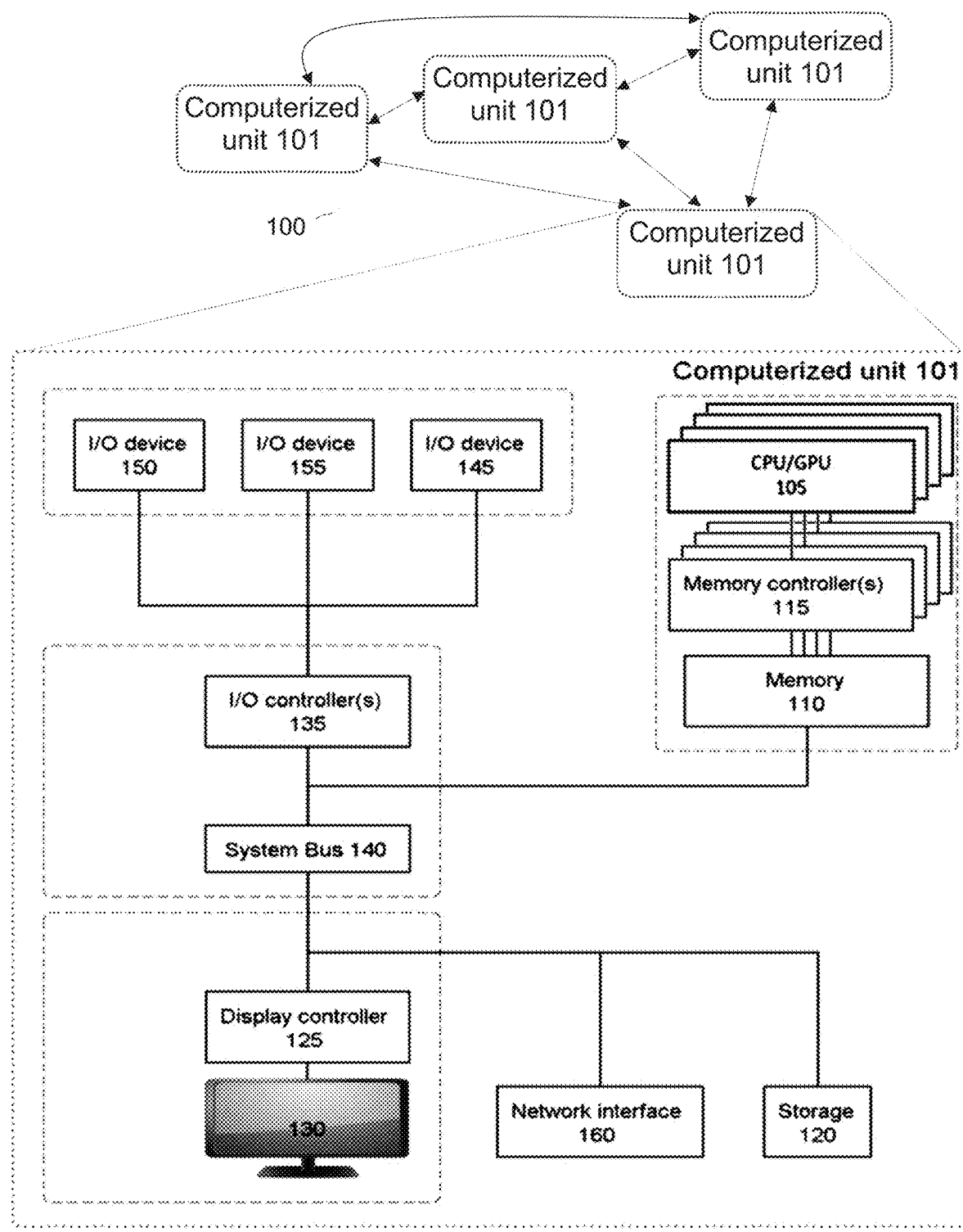
FIG. 3 schematically represents a computerized system, according to embodiments. The system involves several computerized units forming a distributed computing environment, suited for executing steps of a method such as shown in FIG. 1.

In reference to FIGS. 1-3, an aspect of the invention is first described, which concerns a computer-implemented method of training a cognitive model. Note, the present method and its variants are collectively referred to as "the present methods" in the following description. All references "Sij" refer to methods steps of the flowchart of FIG. 1, whereas numeral references pertain to physical parts or components of the system 100 (also referred to as distributed environment 100) shown in FIG. 1, which concerns another aspect of the invention.

The present methods are based on training data samples 11-14, which are typically extracted S15 from a training dataset 10. Such training data samples can also be referred to as training examples. The samples may possibly be labelled. Note, however, that the present methods may be applied for both supervised and unsupervised training purposes. Such methods rely on an iterative training algorithm, which is run in a distributed environment 100. Running this training algorithm essentially causes, at each iteration (i.e., training cycle) of the training algorithm, to run (i.e., launch) S23 preemptable tasks and, if a preemption condition (i.e., a termination condition) is satisfied for a current iteration, to preempt S26 straggling tasks and update S27-S29 the cognitive model based on all available updates.

In detail, the algorithm causes to run S23 preemptable tasks W, which are distributed so as to leverage resources of the distributed computing environment 100. The latter is provided by a computerized system that interconnects distinct units 101, which communicate and coordinate their efforts by passing messages to one another. Prior to launching S23 the tasks W, each task is assigned S22 two or more of training data samples, which are intended to be processed by the tasks during each iteration. Thus, the training algorithm processes multiple training data samples per task and per iteration.

Now, some of these tasks may come to be preempted if a preemption condition is met, during any iteration. The preemption condition relates to currently executing tasks. If the preemption condition is verified to be satisfied (S24: Yes), then any straggling task (i.e., a task that has not yet finished processing all of the training data samples assigned to it) is preempted S26. The cognitive model is then updated S27-S29 based on the available outputs, at each iteration. Now, since the tasks are designed so as to be preemptable, they can produce valid updates, even if they have processed only a subset of the intended training samples. Thus, outputs used for updating the cognitive models include outputs obtained from both the preempted tasks and the completed tasks, i.e., tasks that have finished processing all of the training data samples as initially assigned to them at this iteration.

Updating S29 the cognitive model is preferably carried out so as to make sure that all tasks receive all model updates before starting a next iteration S20-S30. As seen in FIG. 1, at any iteration, the algorithm may further test S40 whether a stopping criterion is met. If so, the training terminates S50. Else, another iteration is started S20.

The iterative-convergent equations can generally be written as:

$$A(i)=F(A(i-1),\Delta_L(A(i-1),x)),$$

where i denotes the iteration number. Each evaluation of the RHS member of this equation produces the next iteration's model parameters A(i), based on: (i) the previous iteration's A(i−1) and data x. Two functions are needed. The first function $\Delta_L$ is an update function, which increases (or updates) the objective L. This function performs computation on data x and a previous model state A(i−1); it outputs an intermediate result. In the present context, $\Delta_L$ takes into account any available output, including outputs obtained from the preempted tasks. The second function F is an aggregation function F that combines results obtained from A(i−1) and $\Delta_L$ to form A(i).

The present approach assumes a distributed ML algorithm, i.e., an algorithm that is parallelized into many computational workers (technically, threads), which are typically spread over many machines (clusters of computers are preferably relied on). A task is a process performed by one or more workers. The latter are computerized processes performed on nodes (computing entities) of the system 100. For example, the system 100 shown in FIG. 3 shows multiple computerized units 101, which may themselves include a plurality of nodes (having distinct processing means 105). A worker basically refers to a process or task that executes part of the training algorithm. In the diagram of FIG. 2, each task (in the sense of the present methods) is assumed to be performed by a respective worker, for simplicity.

Note, the present approach also works for a single machine, provided the latter is able to execute multiple independent tasks (e.g., one per non-uniform memory access node, or NUMA node). To that aim, a single machine may be used, which includes multiple nodes and therefore enable a distributed environment. Yet, several machines will likely be involved, as noted above. Thus, in general, the present approach may possibly involve a single machine with multiple nodes or several machines, each including one or several nodes.

Figure 4A:
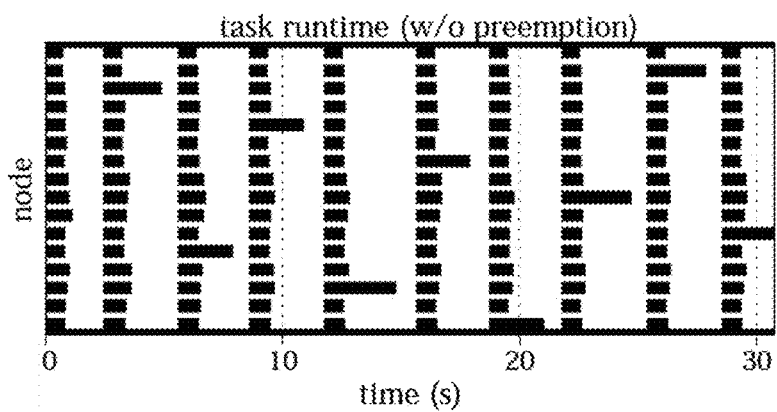
FIGS. 4 and 5 show diagrams illustrating the impact of stragglers on the training time, in the CoCoA framework (FIGS. 4A and 4B) and in the local SGD framework (FIGS. 5A and 5B). The top figures (FIGS. 4A and 5A) illustrate results obtained without implementing any task preemption mechanism, while the bottom figures (FIGS. 4B and 5B) show results obtained using a task preemption mechanism according to embodiments.
Figure 4B:
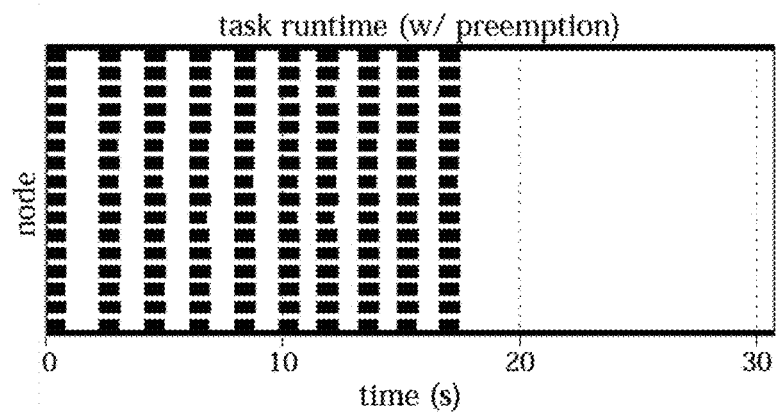
Figure 5A:
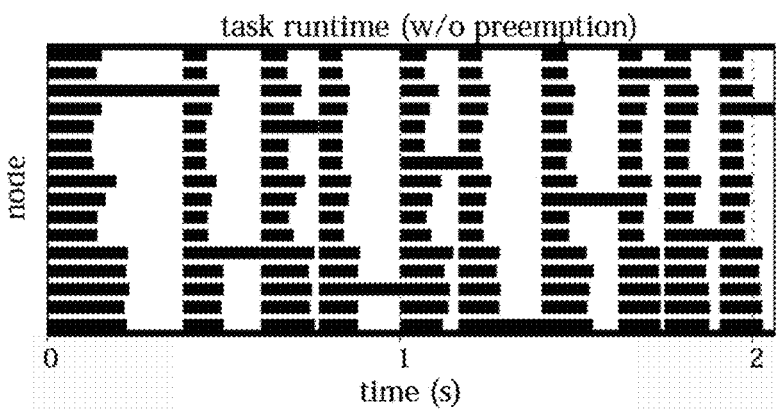

The preemption condition amounts to allocate a dynamic time period for the tasks to execute at each iteration. Tasks that have not completed by the end of this time period (bounded by the time at which the condition S24 is determined to be satisfied) are preempted. The main benefit of this approach is that it accelerates the training. I.e., it allows a clear improvement in terms time needed to achieve a given accuracy without increasing the number of epochs needed, as illustrated in FIGS. 4 and 5. The improvements will depend on the system used and the system load. Beyond the examples shown in FIGS. 4 and 5, tests performed by the inventors have shown that the training time may possibly be sped up by up to 10×. The present task preemption approach does not increase the number of epochs needed to converge; it may even result in reducing the number of epochs in some cases, unlike methods based on bounded asynchronicity or micro-tasks. In addition, the present approach does not need additional resources (as with backup workers).

In principle, this approach is applicable to all iterative distributed ML training algorithms that process multiple training samples per task per iteration. The cognitive model may notably be a generalized linear model or involve an artificial neural network (ANN), such as a deep neural network (DNN), a convolutional neural network (CNN), or a recurrent neural network (RNN), for example. More generally, the present approach can be applied to any training algorithm involving multiple training samples per task and per iteration.

All this is now described in detail, in reference to particular embodiments of the invention. To start with, any of the preempted tasks is preferably allowed to finish processing a training data sample that is currently being processed. This task will therefore return outputs as obtained after having finished processing the current training data sample. However, the algorithm prevents this tasks to start processing another sample. In other words, some latency is allowed to allow straggling tasks to complete the processing of samples that are currently being processed by such tasks. In practice, this is achieved thanks to the solver algorithm that runs in each task. This guarantees that any preempted task may return some valid output. In variants, straggling tasks may be abruptly interrupted, or the additional time granted to straggling tasks to complete current samples may be limited. In that case, some of the preempted tasks may not be able to produce any output. This, however, can be avoided by suitably choosing the preemption condition.

The update steps S27-S29 preferably comprise (at each iteration) adjusting S28 updates arising from outputs obtained from each of the preempted tasks W, as assumed in the flowchart of FIG. 1. This is done so as to account for training data samples that have not been processed by the preempted tasks. This adjustment may simply be achieved by weighting S28 updates arising from outputs obtained from each preempted task. The weights may notably depend on (monitored samples e.g., S21) on the number of samples that the preempted tasks finished processing (during each iteration). For example, updates from any task may be weighted according to ratios of the number of samples processed to the number of initially assigned samples. More generally, though, the weight adjustment will be algorithm dependent.

The present methods preferably leverage an auto-correcting capability of the iterative ML training algorithm. The auto-correcting capability of the algorithm means that errors introduced in one iteration may automatically be corrected in subsequent iterations. Auto-correction is an inherent property of iterative-convergent ML algorithms such as CoCoA and (mini-batch) SGD. In the present context too, the auto-correcting capability of the iterative ML training algorithm can be exploited where tasks are preempted, i.e., when not all planned training samples are processed by tasks during an iteration. This introduces a small error, because the weights that are used to merge updates from the various tasks are approximate. E.g., updates obtained from 10 training samples are not necessarily twice as important as updates obtained from 5 samples only. This is for example true in a framework similar to that of CoCoA. In a mini-batch SGD approach, however, the weights would be exact, as, in this case, updates obtained from 10 samples would indeed be twice as important as those obtained from 5 samples.

In addition, the training algorithm may involve a compensation scheme, designed so as to make sure that any sample that is not processed at a given iteration will be processed during a subsequent iteration. That is, at a given iteration of the algorithm, the tasks W run S23 may initially be assigned S22 given samples to process, wherein such samples include one or more samples that were not processed (e.g., S21) during a previous iteration, owing to tasks that were previously preempted. This may typically require to monitor the samples (e.g., S21) that have been processed (and correspondingly the samples that have not been processed yet), as assumed in FIG. 1. Note, monitoring the processed samples may further be exploited to weigh updates obtained from preempted tasks as updates are weighted (multiplied with a factor).

In addition, the present methods may further monitor S25 completion statuses of the preemptable tasks run S23 during each iteration, a thing that may be exploited to determine the end of the time period allocated to each iteration. Namely, the preemption condition may be evaluated S24 (at each iteration) based on the monitored completion statuses.

For example, the preemption condition is verified to be satisfied (S24: Yes) if at least a given fraction of the tasks have finished processing all of the training data samples assigned to them. Formally, this condition may for example be written $F \geq t \times K$, where F denotes the number of tasks that must have completed (in order to trigger the preemption mechanism), K is the number of tasks run at the iteration considered, and t is a threshold parameter, $0 < t \leq 1$. In practice, t will normally be chosen so as to make sure that at least one task must have completed. This parameter may for example be in the range [0.50; 0.95]. In practice, the optimal fraction depends on the underlying system. It is strictly smaller than 1 and typically close to or larger than 0.5. E.g., one may choose t=0.5, as in the examples of FIGS. 4 and 5. For instance, assume that, at a given iteration, the tasks train on L>1 samples (where such tasks are designed so as to produce valid model updates after the processing of any single training sample). Then, as soon as F is found to be larger than $t \times K$, all K−F tasks that are still running are preempted (such tasks may nevertheless be allowed to finish processing current samples).

Referring more specifically to FIG. 3, another aspect of the invention is now described, which concerns a distributed computerized system 100. The latter is configured to train a cognitive model according to any of the methods described earlier. Functional aspects of such a system 100 have already been described in reference to the present methods. Therefore, such aspects are only briefly described in the following.

Basically, the system 100 comprises a plurality of processing means 105, which subtend a distributed computing environment. Such processing means may for example be distributed across several computerized units 101, as assumed in FIG. 3. They may for instance interact with respective main memories 110, in operation. In variants, such processing means may share a same main memory (and a same cache), as in fully parallel architectures. Various degrees of parallelization can thus be contemplated. In all cases, the multiple processing means 105 execute respective tasks and signal each other, as needed to complete the training of the cognitive model.

Note, such processing means 105 may typically correspond to central processing units (CPU) of the units 101, to which CPU caches 112 are associated. In variants, or in addition, to CPUs, computations may be performed using graphics processing units (GPUs) of the units 101. Each CPU/GPU may typically comprise several processing cores.

The system 100 further comprises storage means 120, which notably store computerized methods, where the latter include an iterative training algorithm such as described earlier. That is, in operation of the system 100, the cognitive model is trained based on training data samples 11-14 of the training dataset 10, by running the iterative training algorithm in said distributed environment 100.

As explained earlier, this training algorithm is designed so as to cause the system 100 to run preemptable tasks (distributed so as to leverage the distributed computing environment subtended by the multiple processing means). Each task is initially assigned two or more training samples to process during each iteration. Next, upon verifying that a preemption condition for any current iteration is satisfied, the algorithm further causes the system to preempt any straggling task and update the cognitive model based on all available outputs. The latter include outputs obtained from both the preempted tasks and the completed tasks.

As described earlier, the system may further be designed so as to adjust updates arising from outputs obtained from each preempted task, to account for training data samples that have not been processed yet, e.g., by weighting outputs of the tasks.

In addition, the system 100 preferably implements a compensation mechanism that ensures that samples that were not processed during any previous iteration are processed during a subsequent iteration, as explained earlier. Furthermore, the system may be configured to monitor completion statuses of the tasks, e.g., to evaluate preemption conditions based on the monitored completion statuses of the tasks, at each iteration. Additional aspects of the system 100 and the units 101 making up the system are discussed in section 3.1.

Next, according to a final aspect, the invention can be embodied as a computer program product for training a cognitive model in a distributed environment such as described above. The computer program product comprises a computer readable storage medium having program instructions embodied therewith, wherein the program instructions are executable by a plurality of processing means 105 forming part of this distributed environment 100, so as to cause the plurality of processing means to perform steps according to any of the present methods. Additional aspects of such a computer program product are discussed in section 3.2.

The above embodiments have been succinctly described in reference to the accompanying drawings and may accommodate a number of variants. Several combinations of the above features may be contemplated. Examples are given in the next section.

2. Specific Embodiments

Similarly to approaches as described in the background section, a preferred implementation of the present straggler-mitigation methods exploits the auto-correcting property of the ML training algorithm to mitigate the impact of stragglers. In contrast to other approaches, such as SSP, it further exploits the ability of tasks to produce valid updates after processing only a subset of the intended training samples during any given iteration, by preempting straggling tasks. Task preemption allows the underlying system 100 to make sure that all tasks finish within a certain time. Partial updates are adjusted (weighted) to account for the smaller-than-intended number of processed training samples; the weighted updates are used together with other (normal) updates to update the model for the next iteration. The concrete weight adjustment is algorithm dependent.

The system 100 preferably monitors completion statuses of the tasks (events indicating which tasks complete) during each iteration and preempts all tasks that are still running after a configured amount of the tasks have completed at a current iteration. The solver algorithm that runs in a task causes to finish processing a current sample. Then, instead of continuing with another sample, any update to the model as computed so far is returned to an entity orchestrating the various model updates.

A partial model update includes updates from all samples that have been processed. The residual samples (which could not be processed in the current iteration) will be processed during subsequent iterations. The effectiveness of the mitigation policy depends on the number of samples processed by each task during each iteration, given that any task may possibly be preempted at any time before completing all samples.

A side effect of the task preemption mechanism is that it may reduce the number of epochs needed to converge, whereas other straggler mitigation techniques, such as SSP, tend to increase the number of epochs needed to converge. The reason for this behavior becomes clear when comparing both methods. The task preemption mechanism causes to reduce the effective batch size, as preempted tasks do not process all planned training samples before synchronizing. Still, the method may ensure that all tasks receive all model updates before starting the next iteration. In SSP, the effective batch size may be reduced as well, which generally supports faster convergence per epoch. However, here the tasks are not guaranteed to receive all model updates before starting the next iteration, forcing tasks to work on an outdated (stale) model and thus making the training less effective per processed training sample.

Figure 5B:
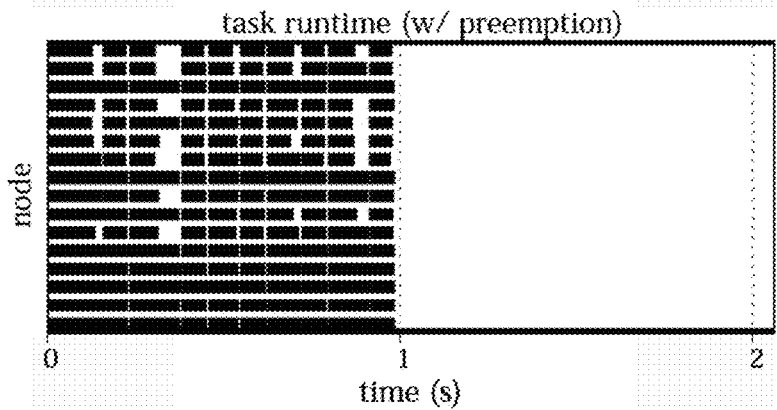

The present approach was tested in the so-called CoCoA (FIG. 4) and local SGD (FIG. 5) frameworks, using various datasets. The exemplary results shown in FIGS. 4 and 5 illustrate benefits in terms of time needed to reach convergence. The threshold parameter used in these examples (FIGS. 4B and 5B) is t=0.5, meaning that approximately half the number of the tasks must have completed before preempting straggling tasks. One straggler was artificially introduced during each iteration in these examples.

3. Technical Implementation Details 3.1 Computerized Systems and Devices

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, the system 100 depicted in FIG. 3 schematically represents multiple computerized units 101 (e.g., general- or specific-purpose computers), interacting so as to make up a distributed computing environment and be able to perform steps according to the present methods.

In exemplary embodiments, in terms of hardware architecture, as shown in FIG. 3, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software, including instructions coming as part of computerized tasks triggers by the iterative ML algorithm. The processors 105 can be any custom made or commercially available processor(s). In general, they may involve any type of semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 3, instructions loaded in the memory 110 may include instructions (e.g., loaded on the fly) arising from the execution of the iterative ML algorithm, consistently with the methods described herein in accordance with exemplary embodiments. The memory 110 may further load a suitable operating system (OS) 111. The OS 111 essentially controls the execution of other computer programs or instructions and provides scheduling, input-output control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. Any computerized unit 101 will typically include a network interface or transceiver 160 for coupling to a network, to enable, in turn, data communication to/from other, external components, starting with other units 101 subtending the distributed environment.

The network transmits and receives data between a given unit 101 and other external devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of training a cognitive model based on training data samples of a training dataset by running an iterative training algorithm in a distributed environment, wherein running the training algorithm comprises, at each iteration of a plurality of iterations of the training algorithm comprises:
running preemptable tasks distributed according to the distributed environment, wherein each task of a plurality of preemptable tasks has been assigned two or more of the training data samples to process during each iteration; and
upon verifying that a preemption condition for each iteration is satisfied:
preempting any task of the preemptable tasks that have started processing training data samples assigned to it, and
updating the cognitive model based on outputs obtained from completed tasks, including outputs obtained from both the preempted tasks and completed tasks that have finished processing all training data samples as assigned to it.

2. The computer-implemented method according to claim 1, further comprising:
updating the cognitive model at each iteration by adjusting updates arising from outputs obtained from each of the preempted tasks, to account for training data samples that have not been processed by the preempted tasks.

3. The computer-implemented method according to claim 2, wherein adjusting the updates comprises weighting the updates arising from outputs obtained from each preempted task of the preempted tasks according to a number of training data samples that each respective preempted task of the preempted tasks finished processing during each iteration.

4. The computer-implemented method according to claim 2, further comprising:
at a subsequent iteration of the algorithm after a previous iteration thereof, running remaining tasks of the plurality of preemptable tasks, wherein the subsequent iteration is distributed according to the distributed environment and has been assigned subsequent training data samples to process during the subsequent iteration, and
the subsequent training samples include one or more of the training data samples that were not processed during the previous iteration because one or more tasks were preempted during this previous iteration.

5. The computer-implemented method according to claim 1, further comprising:
monitoring completion statuses of each preemptable task of the plurality of preemptable tasks run during each iteration.

6. The computer-implemented method according to claim 5, further comprising:
evaluating the preemption condition at each iteration, based on the monitored completion statuses.

7. The computer-implemented method according to claim 6, wherein the preemption condition is satisfied if at least a fraction of the preemptable tasks run have finished processing the training data samples.

8. The computer-implemented method according to claim 1, further comprising:
allowing any task of a plurality of preempted tasks is to finish processing a training data sample that is currently being processed to return outputs as obtained after having finished processing respective training data samples.

9. A distributed computer system for training a cognitive model, the distributed computerized system comprising:
one or more computer processors;
one or more computer readable storage media;
an iterative training algorithm stored on the one or more computer readable storage media that is configured to train the cognitive model based on training data samples of a training dataset, by running the iterative training algorithm in the distributed environment; and
program instructions stored on the one or more computer readable storage media for execution by at least one of the one or more computer processors, the program instructions comprising:
program instructions to run preemptable tasks distributed according to the distributed environment, wherein each task of a plurality of preemptable tasks has been assigned two or more of the training data samples to process during each iteration; and
upon verifying that a preemption condition for each iteration is satisfied:
program instructions to preempt any task of the plurality of preemptable tasks that have started processing training data samples assigned to it, and
program instructions to update the cognitive model based on outputs obtained from completed tasks, including outputs obtained from both the preempted tasks and completed tasks that have finished processing all training data samples as assigned to it.

10. The computer system according to claim 9, wherein the program instructions stored on the one or more computer readable storage media further comprise:
program instructions to update the cognitive model at each iteration by adjusting updates arising from outputs obtained from each of the preempted tasks while updating the cognitive model at each iteration, to account for training data samples that have not been processed by the preempted tasks at each iteration.

11. The computer system according to claim 10, wherein the program instructions stored on the one or more computer readable storage media further comprise:
at a subsequent iteration of the algorithm after a previous iteration thereof, running remaining tasks of the plurality of preemptable tasks, wherein the subsequent iteration is distributed according to the distributed environment and has been assigned subsequent training data samples to process during the subsequent iteration, and
the subsequent training samples include one or more of the training data samples that were not processed during the previous iteration because one or more tasks were preempted during this previous iteration.

12. The computer system according to claim 9, wherein the program instructions stored on the one or more computer readable storage media further comprise:
    program instructions to monitor completion statuses of the preemptable tasks run during each iteration.

13. The computer system according to claim 12, wherein the program instructions stored on the one or more computer readable storage media further comprise:
    program instructions to evaluate the preemption condition at each iteration, based on the monitored completion statuses.

14. A computer program product for training a cognitive model in a distributed environment, the computer program product comprising:
    one or more computer readable storage media and program instructions stored on the one or more computer readable storage media, the program instructions comprising:
        program instructions to run preemptable tasks distributed according to the distributed environment, wherein each task of a plurality of preemptable tasks has been assigned two or more of the training data samples to process during each iteration; and
        upon verifying that a preemption condition for each iteration is satisfied:
            program instructions to preempt any task of the plurality of preemptable tasks that have started processing training data samples assigned to it, and
            program instructions to update the cognitive model based on outputs obtained from completed tasks, including outputs obtained from both the preempted tasks and completed tasks that have finished processing all training data samples as assigned to it.

15. The computer program product according to claim 14, wherein the program instructions stored on the one or more computer readable storage media further comprise:
    program instructions to update the cognitive model at each iteration by adjusting updates arising from outputs obtained from each of the preempted tasks while updating the cognitive model at each iteration, to account for training data samples that have not been processed by the preempted tasks at each iteration.

16. The computer program product according to claim 15, wherein the program instructions stored on the one or more computer readable storage media further comprise:
    program instructions to adjust updates by weighting the updates arising from outputs obtained from each preempted task of the preempted tasks according to a number of training data samples that each respective preempted task of the preempted tasks finished processing during each iteration.

17. The computer program product according to claim 15, wherein the program instructions stored on the one or more computer readable storage media further comprise:
    at a subsequent iteration of the algorithm after a previous iteration thereof, running remaining tasks of the plurality of preemptable tasks, wherein the subsequent iteration is distributed according to the distributed environment and has been assigned subsequent training data samples to process during the subsequent iteration, and
    the subsequent training samples include one or more of the training data samples that were not processed during the previous iteration because one or more tasks were preempted during this previous iteration.

18. The computer program product according to claim 14, wherein the program instructions stored on the one or more computer readable storage media further comprise:
    program instructions to monitor completion statuses of the preemptable tasks run during each iteration.

19. The computer program product according to claim 18, wherein the program instructions stored on the one or more computer readable storage media further comprise:
    program instructions to evaluate the preemption condition at each iteration, based on the monitored completion statuses.

20. The computer program product according to claim 19, wherein the program instructions stored on the one or more computer readable storage media further comprise:
    program instructions to determine that the preemption condition is satisfied if at least a fraction of the preemptable tasks run have finished processing respective training data samples.

* * * * *